United States Patent
Yin et al.

(10) Patent No.: US 11,936,958 B2
(45) Date of Patent: Mar. 19, 2024

(54) AUTOMATIC APPENDING OF SUBTITLES BASED ON MEDIA CONTEXT

(71) Applicant: International Business Machines Corporation, Armonk, NY (US)

(72) Inventors: Jian Dong Yin, Beijing (CN); Wen Wang, Beijing (CN); Zhuo Cai, Beijing (CN); Rong Fu, Ningbo (CN); Hao Sheng, Ningbo (CN); Kang Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/387,316

(22) Filed: Jul. 28, 2021

(65) Prior Publication Data

US 2023/0030342 A1 Feb. 2, 2023

(51) Int. Cl.
| | |
|---|---|
| *H04N 21/488* | (2011.01) |
| *G06V 20/20* | (2022.01) |
| *G06V 20/52* | (2022.01) |
| *H04N 21/439* | (2011.01) |
| *H04N 21/44* | (2011.01) |

(52) U.S. Cl.
CPC ......... *H04N 21/4884* (2013.01); *G06V 20/20* (2022.01); *G06V 20/52* (2022.01); *H04N 21/4394* (2013.01); *H04N 21/44008* (2013.01)

(58) Field of Classification Search
CPC ........... H04N 21/4884; H04N 21/4394; H04N 21/44008; G06V 20/20; G06V 20/52
See application file for complete search history.

(56) References Cited

U.S. PATENT DOCUMENTS

| | | | |
|---|---|---|---|
| 7,961,949 B2 | 6/2011 | Levy | |
| 8,763,023 B1* | 6/2014 | Goetz | H04H 60/377 725/20 |
| 2004/0044532 A1* | 3/2004 | Karstens | H04N 21/4126 704/271 |
| 2010/0259676 A1* | 10/2010 | Swan | H04N 21/4884 348/468 |
| 2017/0287481 A1 | 10/2017 | Bhat | |
| 2018/0199112 A1 | 7/2018 | Chou | |
| 2019/0096407 A1 | 3/2019 | Lambourne | |
| 2020/0242172 A1* | 7/2020 | Santiago | G06F 16/951 |

FOREIGN PATENT DOCUMENTS

CN 103226948 A 7/2013

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Alazar Tilahun
(74) *Attorney, Agent, or Firm* — Nicholas A. Welling

(57) ABSTRACT

A processor may automatically generate one or more transcripts based on a media context. The processor may append at least one of the one or more transcripts to the media. The processor may modify the at least one of the one or more transcripts based on an adjustment to a weight factor.

20 Claims, 9 Drawing Sheets

(56) References Cited

OTHER PUBLICATIONS

MGPARMAR18PLUS, "TV Channels Showing Subtitle & Audio Description." Published Aug. 15, 2019. 8 pages. Published by Dreamdth. https://dreamdth.com/community/threads/tv-channels-showing-subtitle-audio-description.123834/.

Sinha, et al., "Detecting Emotional Scene of Videos from Subtitles." Published Apr. 17, 2015. 12 pages. Published by Indian Institute of Technology. https://cse.iitk.ac.in/users/cs365/2015/_submissions/uutsav/report.pdf.

Tadmor-Ramanovich, et al., "On-Device Captioning with Live Caption." Published Oct. 29, 2019. 4 pages. Published by Google. https://ai.googleblog.com/2019/10/on-device-captioning-with-live-caption.html.

* cited by examiner

AUTOMATIC APPENDING OF SUBTITLES BASED ON MEDIA CONTEXT

BACKGROUND

The present disclosure relates generally to the field of closed captioning/subtitling, and more specifically to automatically appending additional subtitles based on scene recognition from dynamic video context.

Traditional subtitles in video only display dialog text on screen when performers speak; or in order to provide time/place information, such as: two (2) years ago, five (5) years later, now in Los Angeles, etc. In many instances the displayed dialog subtitle on screen is not enough to help provide more fine-tuned information, such as: background music or background voice; this background information is not included in the dialog subtitle on screen. However, this background information may be useful to help enhance the understanding of a scene.

SUMMARY

Embodiments of the present disclosure include a method, computer program product, and system for automatically appending additional transcription in a media. A processor may automatically generate one or more transcripts based on a media context. The processor may append at least one of the one or more transcripts to the media. The processor may modify the at least one of the one or more transcripts based on an adjustment to a weight factor.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
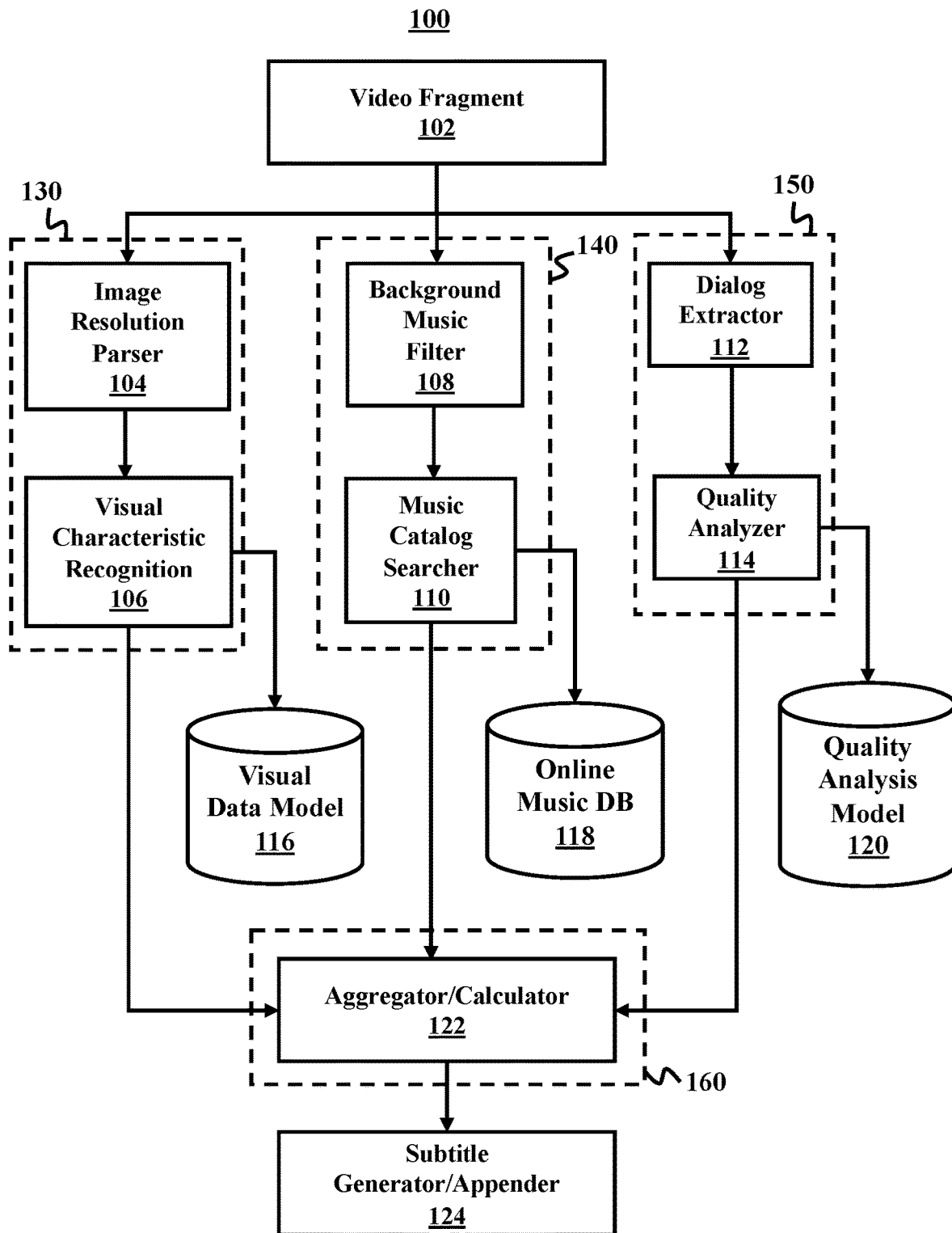
FIG. 1A illustrates a block diagram of an example system for automatically appending additional transcription in a media, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of closed captioning/subtitling, and more specifically to automatically appending additional subtitles based on scene recognition from dynamic video context. While the present disclosure is not necessarily limited to such applications, various aspects of the disclosure may be appreciated through a discussion of various examples using this context.

Traditional subtitles in video only display dialog text on screen when performers speak; or in order to provide time/place information, such as: two (2) years ago, five (5) years later, now in Los Angeles, etc. In many instances the displayed dialog subtitle on screen is not enough to help provide more fine-tuned information, such as: background music or background voice; this background information is not included in the dialog subtitle on screen. However, this background information may be useful to help enhance the understanding of a scene, especially in instances with a user with hearing impairment and/or when a media (e.g., video) is being played in a crowd causing inaudibility.

Accordingly, discussed throughout this disclosure is a solution to automatically identify background features/information during a media/video playing beside a[n] performer/actor conversation or dialog. The solution transforms the background information into descriptive text information and appends the text (e.g., transcript, transcription, etc.) into a current subtitle. In some embodiments, the descriptive text information is appended in such a manner that it conveys a quality (e.g., tone, atmosphere, etc.) of the performer and/or the scene in general (e.g., ominous background music). In such an embodiment, the conveyance of quality could be appended to the subtitle based on a color change in font, bold of font, changes in size of font, parentheticals of tone, etc.

For example, a particular scene in a media/video may only have the dialog of its performers in a subtitle form:

Performer 1: "How was your day?"
Performer 2: "Fine."

The subtitle as exemplified above does not convey tone, and using the solution that will be discussed throughout this disclosure may analyze the full context of the particular scene and identify that the Performer 2's response was spoken quietly and muffled, which may indicate they are in a dejected mood, thus the subtitle may be appended as follows:

Performer 1: "How was your day?"
Performer 2: "Fine." \*\*spoken softly; sad emoticon\*\*.

Thus, the subtitle now conveys to a viewer/user more fine-tuned information as it relates to a quality/tone of the particular scene. In some embodiments, the solution may be applied to each section/fraction/scene of the media/video. In some embodiments, the solution may be a third-party application/plug-in that can be installed and/or used by a single user on their own device and only for the media they are viewing. In some embodiments, the solution may be used by multiple users and as a media is analyzed and updated with appended subtitles, the updated/appended subtitles can be saved in database and subsequently used/retrieved when another user views the same media.

Regardless of embodiment, the advantages of the proposed solution are apparent as it provides more helpful information for in-video subtitles by automatically generating additional subtitles from video context, including, but not limited to background scene, background music and dialog tone. Further, the proposed solution helps users with hearing impairment, or users trying to view a media in a crowd; there is enhanced understanding of scenes, and the solution produces greater understanding of the scenes by these additional subtitle information.

Referring now to FIG. 1A, illustrated is a block diagram of an example system 100 for automatically appending additional transcription in a media, in accordance with aspects of the present disclosure. As depicted, the system 100 includes a video fragment 102, an image resolution parser 104, a visual characteristic recognition 106, a background music filter 108, a music catalog searcher 110, a dialog extractor 112, a quality (tone/emotion) analyzer 114, a visual data model 116, an online music database (DB) 118, a quality (tone) analysis model 120, an aggregator/calculator 122, and a subtitle generator/appender 124.

In some embodiments discussed below in regard to FIGS. 1B-1E, the image resolution parser 104 and the visual characteristic recognition 106 may be the described as a background scene and visual recognition system 130; the background music filter 108 and the music catalog searcher 110 may be described as a background sound/music identification system 140; the dialog extractor 112 and quality analyzer 114 may be described as a media quality analysis system 150; and the aggregator/calculator 122 may be described as an information aggregation and weight calculation system 160.

In some embodiments, the video fragment 102 (e.g., scene) is ingested/forwarded to the system 100 and the video fragment 102 is automatically (and simultaneously) analyzed by the image resolution parser 104, the background music filter 108, and the dialog extractor 112. Each of the image resolution parser 104, the background music filter 108, and the dialog extractor 112 then subsequently forwards their output respectively to the visual characteristic recognition 106, the music catalog searcher 110, and the quality analyzer 114.

In some embodiments, the outputs from the visual characteristic recognition 106, the music catalog searcher 110, and the quality analyzer 114 are automatically (and simultaneously) respectively stored or modeled with/on the visual data model 116, the online music DB 118, and the quality (tone) analysis model 120, in addition to all being forwarded to the aggregator/calculator 122. In some embodiments, the aggregator/calculator 122 determines which transcripts/subtitles are to be appended to subtitles associated with a particular scene and the determination is forwarded to the subtitle generator/appender to be generated and appended to the subtitles associated with the particular scene. To help aid with a deeper understanding of system 100 of FIG. 1A, we now turn to FIGS. 1B-1E; it is noted that like reference numerals are used to designate like parts in the accompanying FIGS.

Figure 1B:
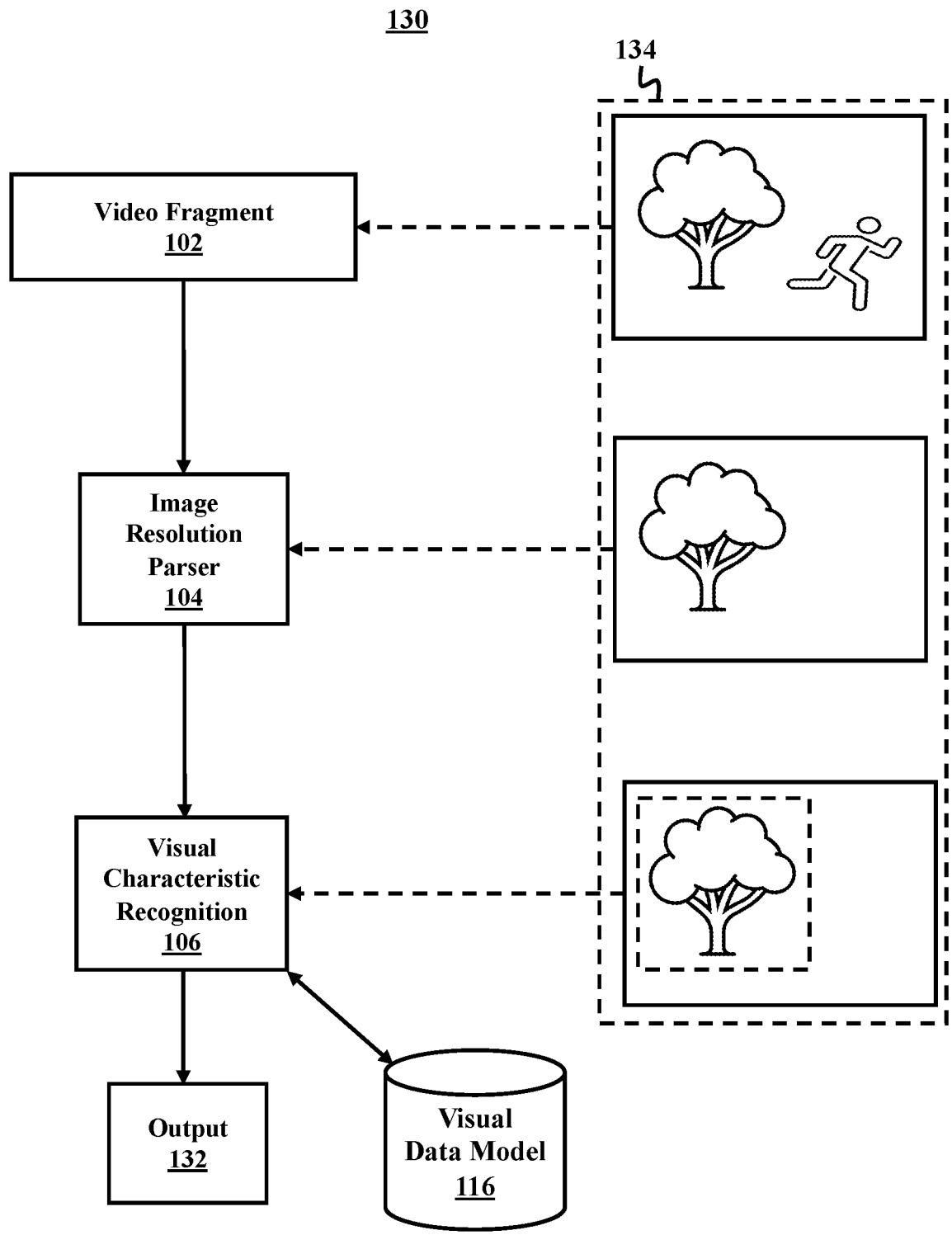
FIG. 1B illustrates an example of a background scene and visual recognition system, in accordance with aspects of the present disclosure.

Referring directly to FIG. 1B, illustrated is an example of the background scene and visual recognition system 130, in accordance with aspects of the present disclosure. As depicted, the background scene and visual recognition system 130 performs analysis 134. The analysis 134 begins with the video fragment 102, which may be associated with the depiction of a tree and a figure running.

The video fragment 102 is sent/forwarded to the image resolution 104, which may foreground image blur, tailor, or parse the video fragment 102, which is depicted in the analysis 134 as just the tree where the foreground figure running has been parsed.

In some embodiments, the parsed video fragment is sent/forwarded to the visual characteristic recognition 106, which may identify a max occupation to a select target area, and which defines the target area as an image to do recognition, which is depicted in the analysis 134 as the tree being outlined in a select target area.

In some embodiments, when identifying a max occupation to a select target area, the visual characteristic recognition 106 communicates with the visual data model 116, which utilizes on pre-defined object data model to take recognition. In such an embodiment, this gets result as quickly as possible by machine learning (e.g., CNN) or by characteristic value (e.g., ORB). In some embodiments, the visual characteristic recognition 106 provides an output 132, which indicates background areas of the video segment, e.g., 90% tree(s), 85% park, etc.

Figure 1C:
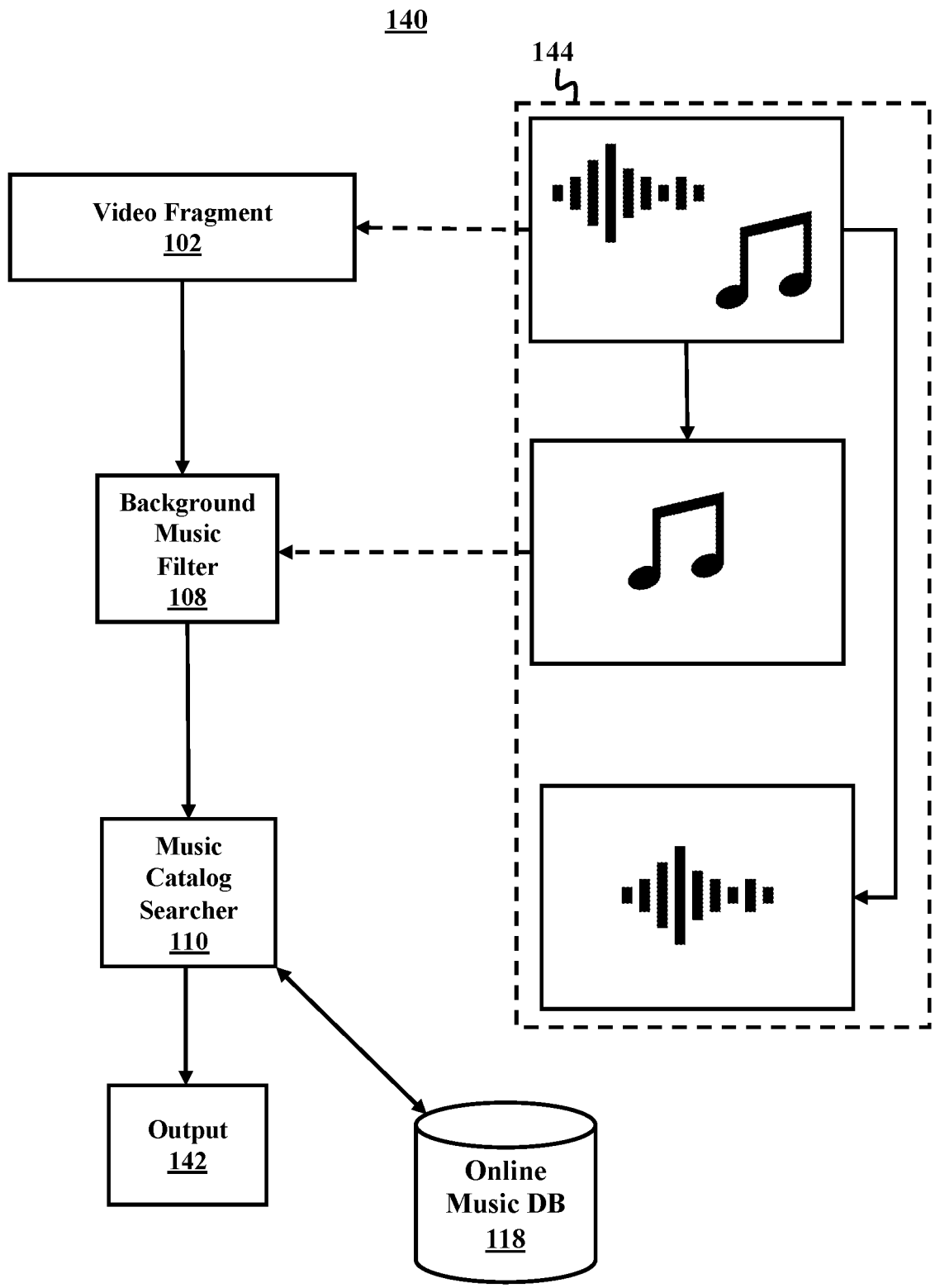
FIG. 1C illustrates an example of a background sound/music identification system, in accordance with aspects of the present disclosure.

Referring directly to FIG. 1C, illustrated is an example of a background sound/music identification system 140, in accordance with aspects of the present disclosure. As depicted, the background sound/music identification system 140 performs analysis 144. The analysis 144 begins with the video fragment 102, which may be associated with the depiction of a soundwave (e.g., performer/forefront voice(s), etc.) and a music symbol (e.g., background voice(s), music, sound, etc.).

In some embodiments, the video fragment 102 is sent/forwarded to the background music filter 108, which may analyze the video fragment 102 by cutting/parsing the video fragment 102 into one or more small pieces, such as: 5 seconds. The background music filter 108 may then filter human voices and keep background music or sound. The filtering may be associated with the depictions of just the soundwave and the music symbol. As further depicted, the background music filter 108 may only retain background noise (music symbol) and ignore the voice(s) (soundwave).

The background music filter 108 then sends/forwards the retained background noise to the music catalog searcher 110, which works in conjunction with the online music DB 118. The music catalog searcher 110 analyzes the background noise (e.g., for distinct features such as beat, tone, etc.) and then searches the online music DB 118 for a likely match. The match is then output 142, the output 142 may be: "wind sound: 90%, song name by creator, etc."

Figure 1D:
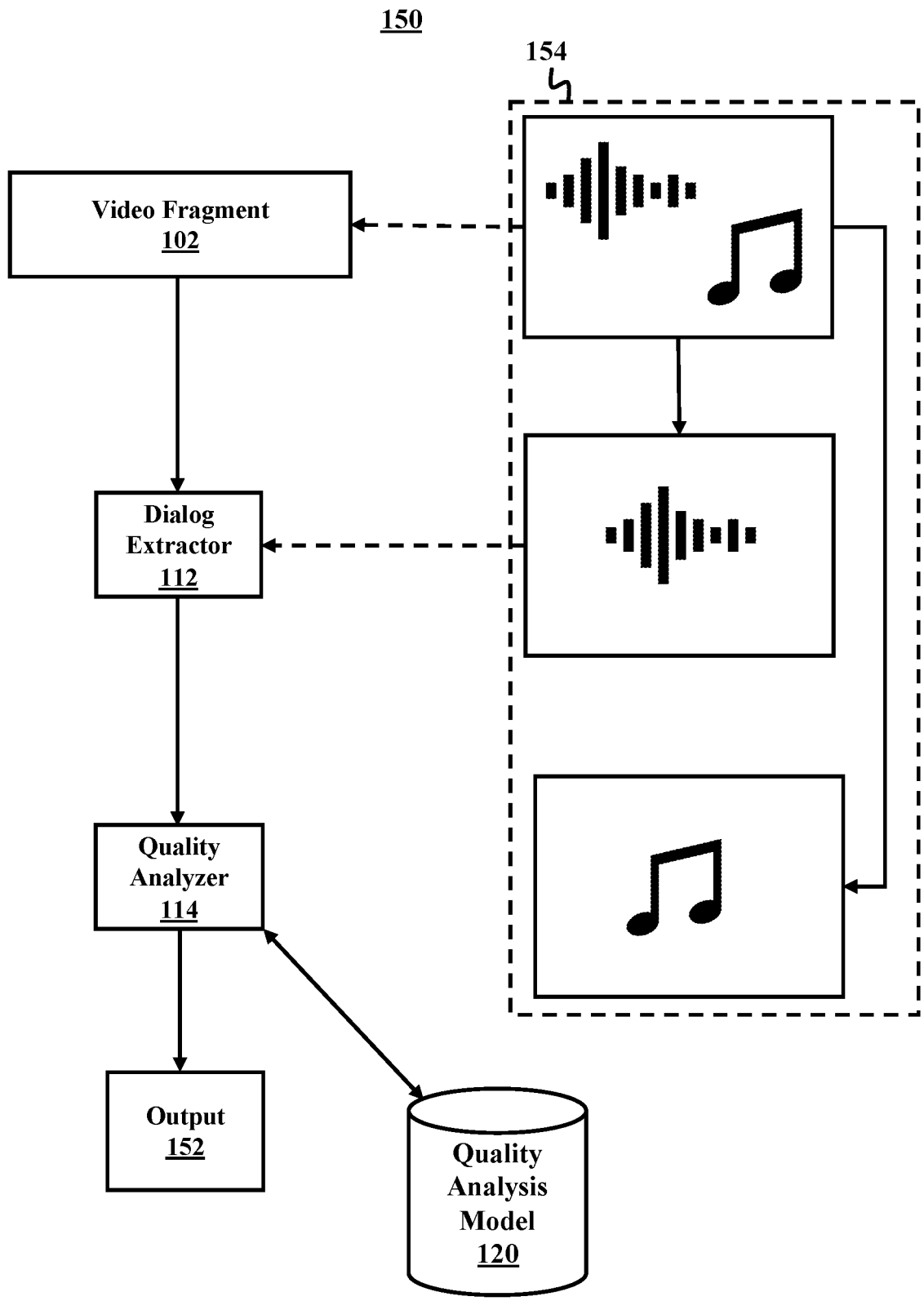
FIG. 1D illustrates an example of a media quality analysis system, in accordance with aspects of the present disclosure.

Referring directly to FIG. 1D, illustrated is an example of a media quality analysis system 150, in accordance with aspects of the present disclosure. As depicted, the media quality analysis system 150 performs analysis 154. The analysis 154 begins with the video fragment 102, which may be associated with the depiction of a soundwave (e.g., performer/forefront voice(s), etc.) and a music symbol (e.g., background voice(s), music, sound, etc.).

In some embodiments, the video fragment 102 is sent/forwarded to the dialog extractor 112, which may analyze the video fragment 102 by cutting/parsing the video fragment 102 into one or more small pieces, such as: 5 seconds. The dialog extractor 112 may then filter background music or sound and keep human voices. The filtering may be associated with the depictions of just the soundwave and the music symbol. As further depicted, the dialog extractor 112 may only retain the voice(s) (soundwave) and ignore background noise (music symbol). The dialog extractor may further translate the voice(s) to text by natural language processing.

The dialog extractor 112 then sends/forwards the retained voice(s) text to the quality analyzer 114, which works in conjunction with the quality analysis model 120. The quality analyzer 114 analyzes retained voice(s) text with the quality analysis model 120 and determines distinct quality features such as tone, emotion, etc. based on dictionaries or machine learning, such as, KNN (which may be a part of the quality analysis model 120). The quality analyzer 114 then produces an output 152, the output 152 may be: "positive overtone: 90% (likely), anger: 80% (likely), etc."

Figure 1E:
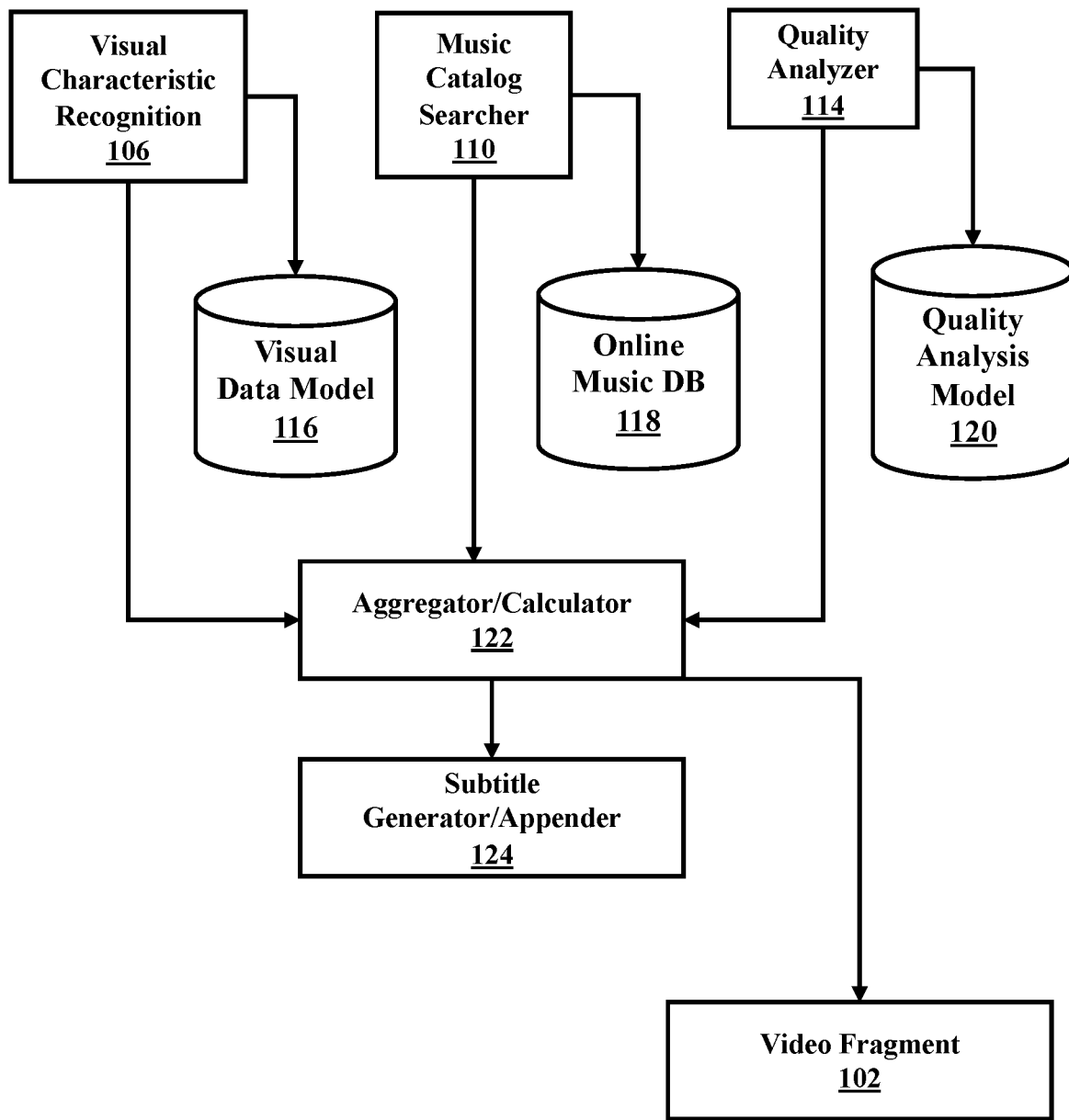
FIG. 1E illustrates an example of an information aggregation and weight calculation system, in accordance with aspects of the present disclosure.

Referring now to FIG. 1E, illustrated is an example of an information aggregation and weight calculation system 160, in accordance with aspects of the present disclosure. For ease of understanding, this particular embodiment and depiction differs from the system 100 in FIG. 1A by eliminating the image resolution parser 104, the background filter 108, and dialog extractor 112, but in some embodiments, they could be included. Further, the information aggregation and weight calculation system 160 directly ingests/communicates with the video fragment 102.

In some embodiments, based on a current video scenario (e.g., scene/video fragment 102), the information aggregation and weight calculation system 160 decides/determines which output (e.g., generated subtitle) should be appended. This determination can be decided based on which high priority feature/quality has a highest priority.

In such an embodiment, using a move figures occupation ratio as an output weight calculation reference, priority is determined as follows:

If a media figure (e.g., performer, actor, person) occupation ration is greater than or equal to 0.5, the appended subtitle priority order is: quality (e.g., emotion/tone) information>background music information>visual recognition information. That is, the quality information will be appended to the subtitles (e.g., "with an upbeat tone");

If a media figure occupation ration is less than 0.5, the appended subtitle priority order is: background music information>emotion/tone information>visual recognition information. That is, the background feature/music information is appended to the subtitles (e.g., "happy music playing");

If no media figure (e.g., only landscape presented), the appended subtitle priority order is: background music information>visual recognition information>emotion/tone information.

Figure 2:
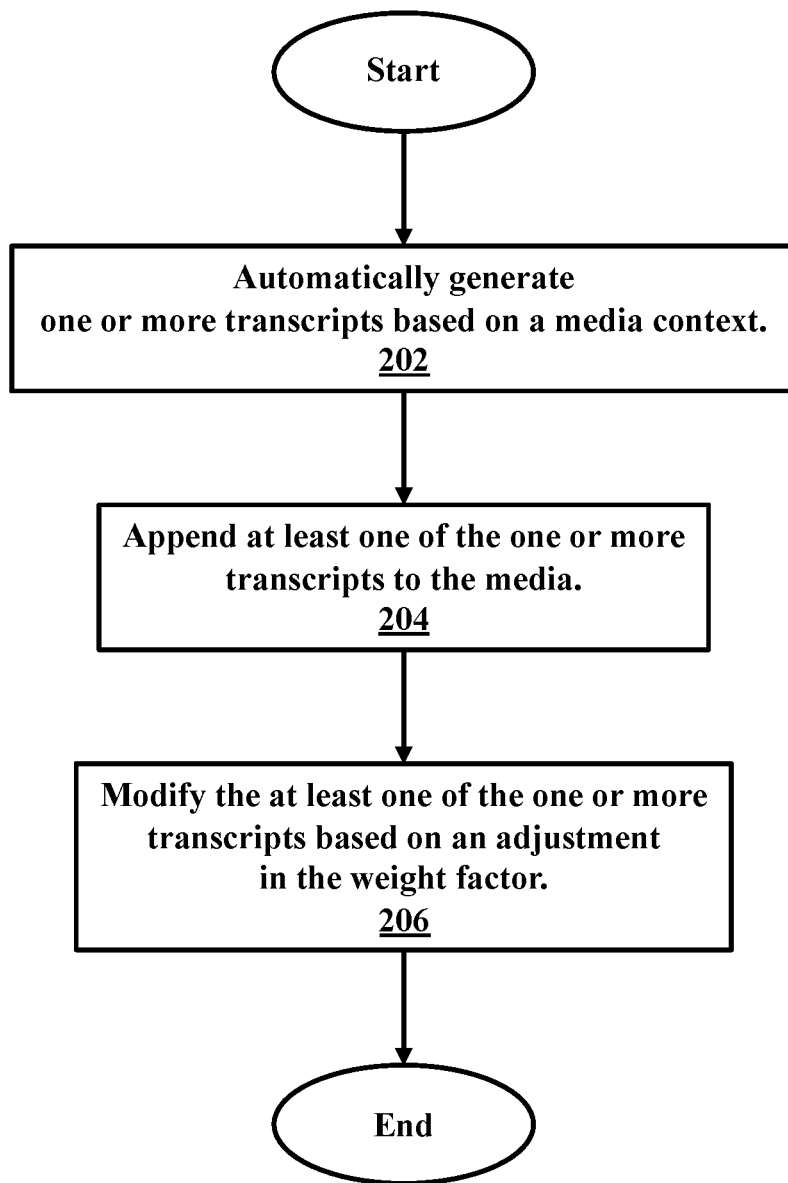
FIG. 2 illustrates a flowchart of an example method for automatically appending additional transcription in a media, in accordance with aspects of the present disclosure.

Referring now to FIG. 2, illustrated is a flowchart of an example method 200 for automatically appending additional transcription in a media, in accordance with aspects of the present disclosure. In some embodiments, the method 200 may be performed by a processor (e.g., of the system 100 of FIG. 1, etc.).

In some embodiments, the method 200 begins at operation 202, where the processor automatically generates one or more transcripts based on a media context. In some embodiments, the method 200 proceeds to operation 204, where the processor appends at least one (suitable transcript) of the one or more transcripts (e.g., subtitles, generated text, etc.) to the media. In some embodiments, the method 200 proceeds to operation 206, where the processor modifies (e.g., changes, adds, appends, etc.) the at least one of the one or more transcripts based on an adjustment to a weight factor (e.g., the scene changes and the ration changes from 0.4 to 0.5, etc.). In some embodiments, after operation 206, the method 200 may end.

In some embodiments, discussed below, there are one or more operations of the method 200 not depicted for the sake of brevity and which are discussed throughout this disclosure. Accordingly, in some embodiments, the media context includes one or more background features (e.g., music, voices, etc.) of the media and a quality (e.g., sentiment/tone/etc. of a scene) of the media.

In some embodiments, the at least one of the one or more transcripts is appended based on the weight factor and the processor generates the weight factor. In some embodiments, generating the weight factor includes the processor analyzing the media (or a scene/section/fragment of the media) for an occupation ration. The processor may further determine whether the (figure) occupation ration is above an occupation threshold and the processor adjusting the weight factor based on the determination (e.g., if a performer is occupying 90% of a frame and/or scene, then their voice is to be more focused on than background noise, thus the appended subtitles would have a tone/quality of the performer indicated, whereas if landscape is 80% present in a frame and/or scene, then the background noise is more focused on than a perform, thus the appended subtitles would have an indication of the noise.

In some embodiments, determining whether the occupation ration is above the occupation threshold includes the processor identifying that the occupation ration is above the occupation threshold and prioritizing the quality (e.g., a sentiment of just a scene, etc.) of the media before the one or more background features of the media.

In some embodiments, determining whether the occupation ration is above the occupation threshold includes the processor identifying that the occupation ration is below the occupation threshold and prioritizing the one or more background features of the media before the quality of the media.

In some embodiments, the adjustment in the weight factor determines a classification (e.g., emoticon, type of text, bolded/underlined/etc., appendage before or after text, font size, etc.) of modification to the at least one of the one or more transcripts.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
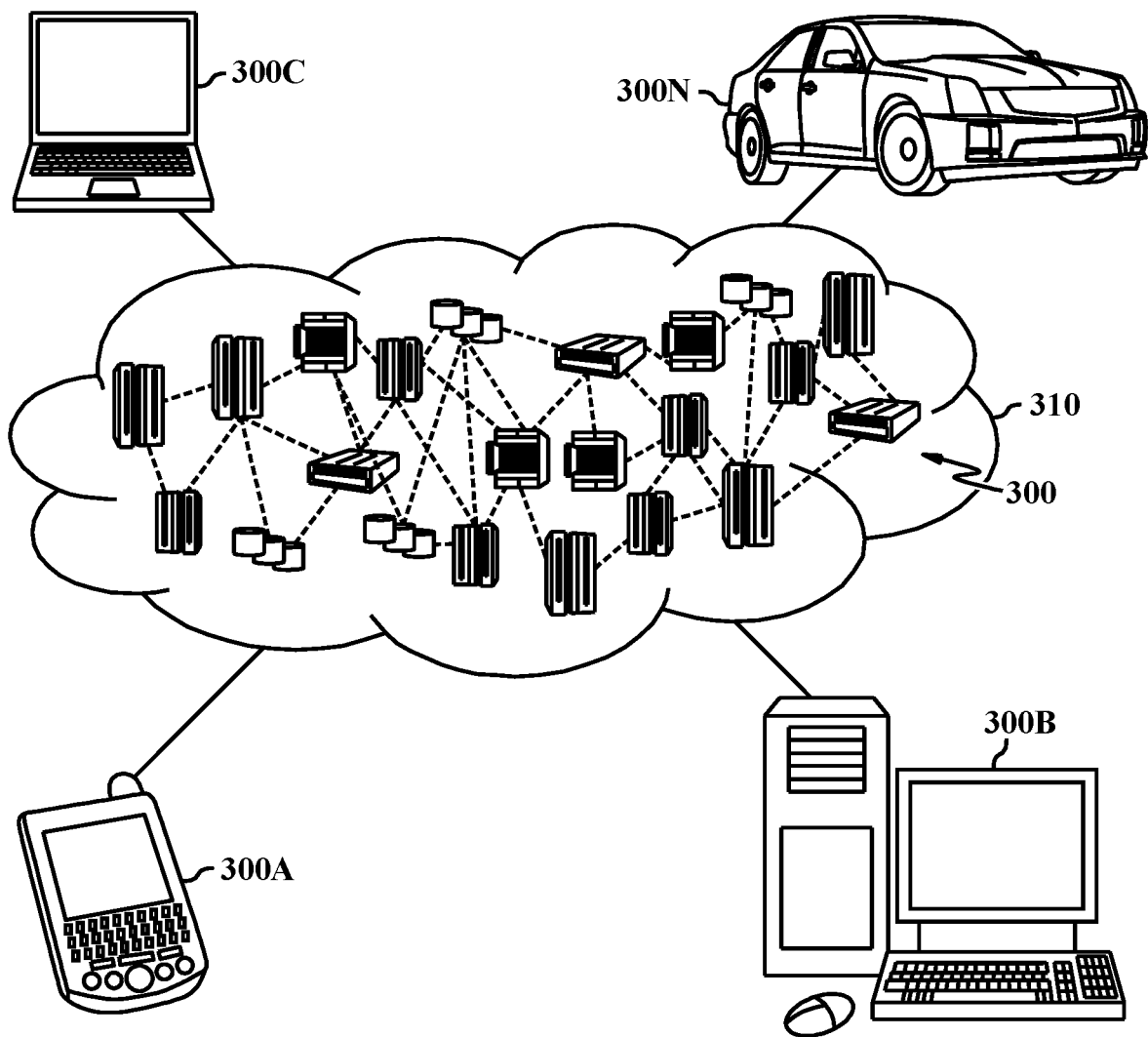
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
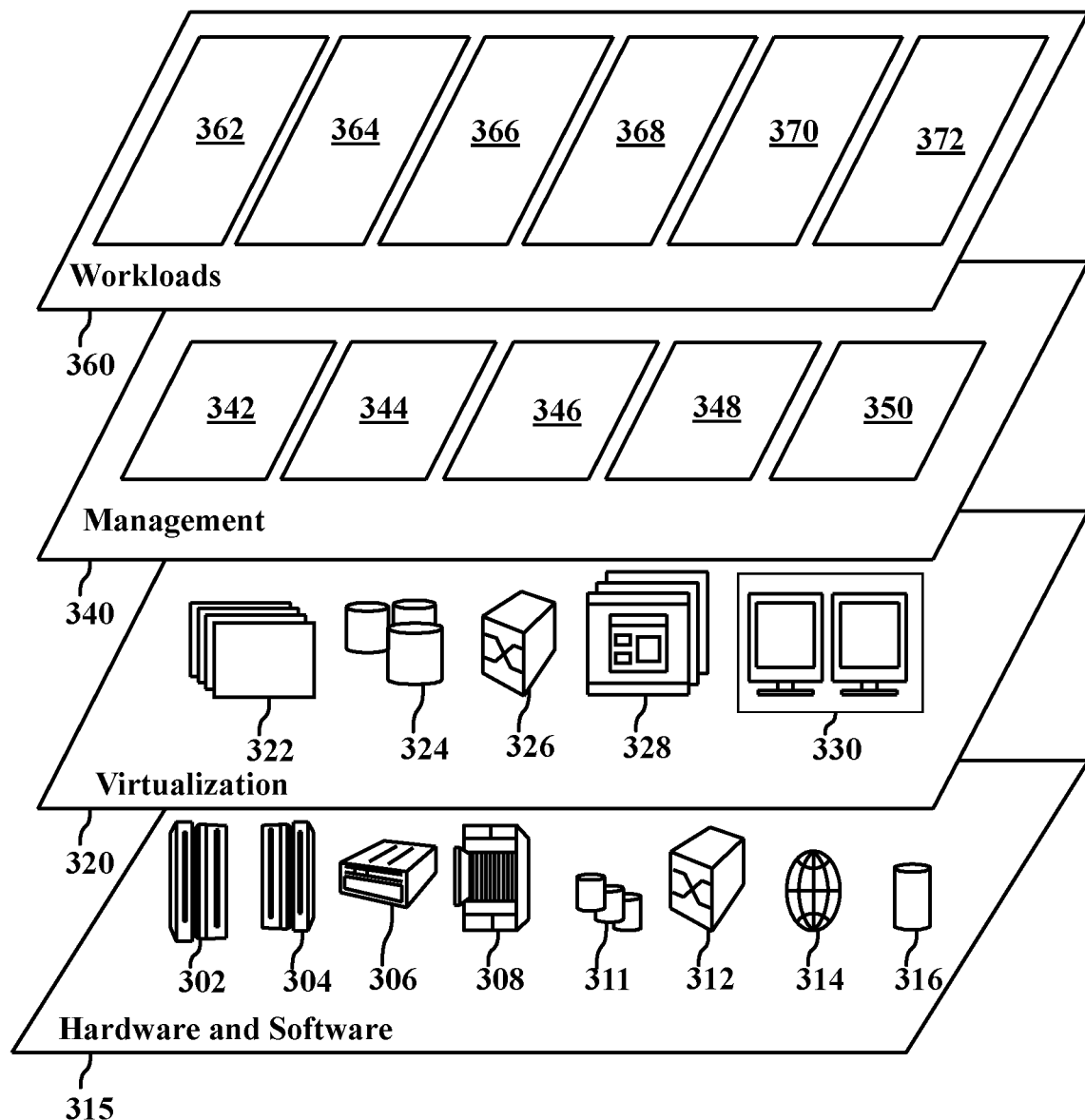
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and automatically appending additional transcription in a media 372.

Figure 4:
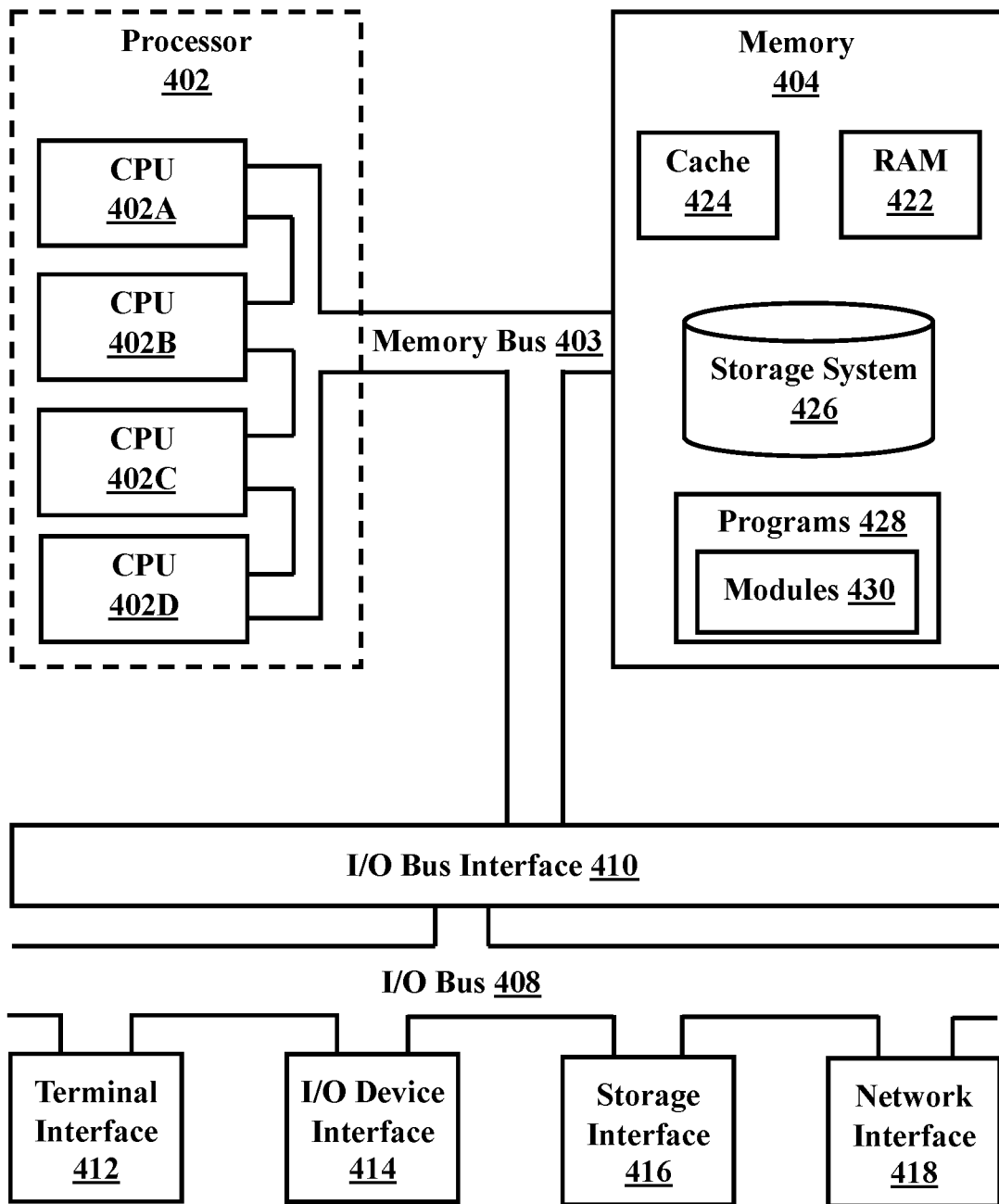
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for automatically appending additional transcription in a media, the system comprising:
    a memory; and
    a processor in communication with the memory, the processor being configured to perform operations comprising:
        extracting dialog from a video fragment, wherein dialog is human voices;
        determining one or more quality features from the extracted dialog;
        identify a tone of the dialog based on the one or more quality features;

generating, automatically, one or more transcripts based on a media context, wherein the one or more transcripts are not a part of an existing transcript of the media;
appending at least one of the one or more transcripts to the media, wherein appending the at least one of the one or more transcripts to the media includes relaying a mood associated with the identified tone of the dialog; and
modifying the at least one of the one or more transcripts based on an adjustment to a weight factor.

2. The system of claim 1, wherein the media context includes one or more background features of the media and a quality of the media.

3. The system of claim 1, wherein the at least one of the one or more transcripts is appended based on the weight factor, and wherein the processor is further configured to perform operations comprising:
generating the weight factor.

4. The system of claim 3, wherein generating the weight factor includes:
analyzing the media for an occupation ration;
determining whether the occupation ration is above an occupation threshold; and
adjusting the weight factor based on the determination.

5. The system of claim 4, wherein determining whether the occupation ration is above the occupation threshold includes:
identifying that the occupation ration is above the occupation threshold; and
prioritizing the quality of the media before the one or more background features of the media.

6. The system of claim 4, wherein determining whether the occupation ration is above the occupation threshold includes:
identifying that the occupation ration is below the occupation threshold; and
prioritizing the one or more background features of the media before the quality of the media.

7. The system of claim 4, wherein the adjustment in the weight factor determines a classification of modification to the at least one of the one or more transcripts.

8. A computer-implemented method for automatically appending additional transcription in a media, the method comprising:
extracting dialog from a video fragment, wherein dialog is human voices;
determining one or more quality features from the extracted dialog;
identify a tone of the dialog based on the one or more quality features;
generating, automatically, one or more transcripts based on a media context, wherein the one or more transcripts are not a part of an existing transcript of the media;
appending at least one of the one or more transcripts to the media, wherein appending the at least one of the one or more transcripts to the media includes relaying a mood associated with the identified tone of the dialog; and
modifying the at least one of the one or more transcripts based on an adjustment to a weight factor.

9. The computer-implemented method of claim 8, wherein the media context includes one or more background features of the media and a quality of the media.

10. The computer-implemented method of claim 8, wherein the at least one of the one or more transcripts is appended based on the weight factor, and wherein the method further comprises:
generating the weight factor.

11. The computer-implemented method of claim 10, wherein generating the weight factor includes:
analyzing the media for an occupation ration;
determining whether the occupation ration is above an occupation threshold; and
adjusting the weight factor based on the determination.

12. The computer-implemented method of claim 11, wherein determining whether the occupation ration is above the occupation threshold includes:
identifying that the occupation ration is above the occupation threshold; and
prioritizing the quality of the media before the one or more background features of the media.

13. The computer-implemented method of claim 11, wherein determining whether the occupation ration is above the occupation threshold includes:
identifying that the occupation ration is below the occupation threshold; and
prioritizing the one or more background features of the media before the quality of the media.

14. The computer-implemented method of claim 11, wherein the adjustment in the weight factor determines a classification of modification to the at least one of the one or more transcripts.

15. A computer program product for automatically appending additional transcription in a media comprising a computer readable storage medium having program instructions embodied therewith, the program instructions executable by a processor to cause the processor to perform operations, the operations comprising:
extracting dialog from a video fragment, wherein dialog is human voices;
determining one or more quality features from the extracted dialog;
identify a tone of the dialog based on the one or more quality features;
generating, automatically, one or more transcripts based on a media context, wherein the one or more transcripts are not a part of an existing transcript of the media;
appending at least one of the one or more transcripts to the media, wherein appending the at least one of the one or more transcripts to the media includes relaying a mood associated with the identified tone of the dialog; and
modifying the at least one of the one or more transcripts based on an adjustment to a weight factor.

16. The computer program product of claim 15, wherein the media context includes one or more background features of the media and a quality of the media.

17. The computer program product of claim 15, wherein the at least one of the one or more transcripts is appended based on the weight factor, and wherein the processor is further configured to perform operations comprising:
generating the weight factor.

18. The computer program product of claim 17, wherein generating the weight factor includes:
analyzing the media for an occupation ration;
determining whether the occupation ration is above an occupation threshold; and
adjusting the weight factor based on the determination.

19. The computer program product of claim 18, wherein determining whether the occupation ration is above the occupation threshold includes:
identifying that the occupation ration is above the occupation threshold; and
prioritizing the quality of the media before the one or more background features of the media.

20. The computer program product of claim 18, wherein determining whether the occupation ration is above the occupation threshold includes:
- identifying that the occupation ration is below the occupation threshold; and
- prioritizing the one or more background features of the media before the quality of the media.

* * * * *